Dec. 2, 1941.   L. F. PAYNE   2,264,403
FLUID TREATMENT APPARATUS
Filed Dec. 5, 1938
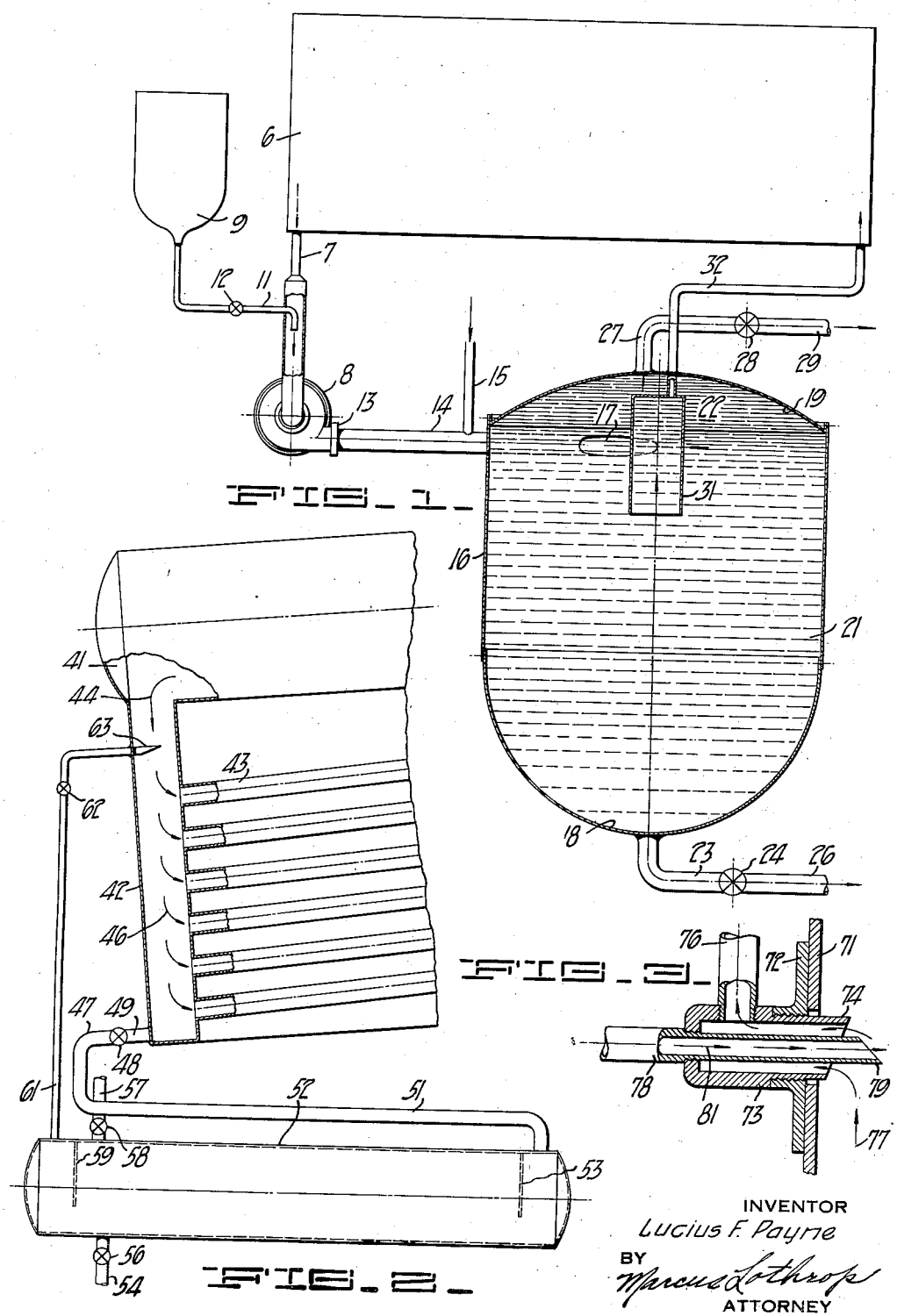
INVENTOR
Lucius F. Payne
BY
Marcus Lothrop
ATTORNEY Patented Dec. 2, 1941

2,264,403

UNITED STATES PATENT OFFICE 2,264,403

FLUID TREATMENT APPARATUS

Lucius F. Payne, Sacramento, Calif.

Application December 5, 1938, Serial No. 244,026

1 Claim. (Cl. 210—61)

My invention relates to means for treating liquids, and is concerned especially with apparatus for treating liquids which are recirculated and which contain impurities or solid materials therein which it is desired to extract therefrom.

In the operation of many heat exchange systems, not only refrigeration systems but also boiler plants, the liquid utilized is water which often contains an amount of impurity which is customarily considered as deleterious and should be removed. In the case of a boiler it is the usual practice to permit solid materials to accumulate for a time period and then to blow them out of the boiler by opening a blow-off cock thereby discharging not only the solid materials but also a large amount of hot water under pressure so that there is an uneconomical loss of heat and of pressure. With respect to refrigeration systems, sediment or solid material customarily accumulates in an awkward part of the system, for example, in the pans of the cooling tower, where it is exceedingly difficult to remove the sediment without totally interrupting the operation of the apparatus.

It is therefore an object of my invention to provide means for removing solid material from the liquid employed in a heat exchanging system, particularly while the circulation of such liquid is uninterrupted.

Another object of my invention is to provide means for removing solid materials from circulating liquid in a way which can be adapted to any standard heat exchange system.

Another object of my invention is to provide means which efficiently and effectively removes solid materials from liquids.

Another object of my invention is to provide means for removing solid materials from liquids without substantial change of pressure or of heat.

The foregoing and other objects are attained in the embodiments of the invention illustrated in the drawing, in which Fig. 1 is a diagrammatic showing, some parts being in cross-section, of a heat exchange system with which is incorporated the liquid treatment apparatus of my invention;

Fig. 2 is a diagrammatic view, parts being in cross-section, of a modified form of liquid treatment mechanism attached to a boiler;

Fig. 3 is a detail showing, principally in cross-section, of a pipe connection utilized in conjunction with my liquid treatment mechanism.

In its preferred form, the liquid treatment mechanism of my invention includes means installed in connection with a heat exchanger for continuously removing a portion only of the liquid from the heat exchanger, means for circulating it in a spiral or vortical manner, preferably after the introduction of a treating substance, and permitting solid material to settle during such vortical movement, and means for discharging the remaining liquid substantially from the center of the vortical chamber and returning it to the heat exchange system for reuse. There is also included in the system means for releasing from time to time accumulated solid material, whether supernatant or sedimentary.

In referring to a heat exchange system herein, I intend to refer not only to a boiler mechanism but likewise to cooling towers and other places where water is utilized, usually evaporatively, for purposes of conveying heat. Thus, for example, in Fig. 1 I have shown a chamber 6 containing a body of liquid which is substantially turbulent. The chamber 6 represents a boiler or a cooling tower; but in either event there is involved a relatively large quantity of water in a relatively turbulent state so that solid material included therewith does not settle out.

In accordance with my invention, therefore, I provide a connection 7 at an appropriate part of the mechanism 6, serving as an outlet. Circulation from said outlet is established either by natural means or by the provision of a suitable pump 8 diagrammatically represented as a centrifugal pump the inlet of which is connected to the outlet 7. In the event the undesired or deleterious material contained in the liquid is not in the form of separate or discreet particles, I provide means for adding a treating substance thereto to produce such separation of particles. For that reason, there is provided a container 9 filled with treating material, which is introduced into the outlet 7 by a conduit 11 under the control of a manually adjustable valve 12.

The mixed treating material and liquid withdrawn from the chamber 6 is not only propelled by the pump 8 but is thoroughly mixed together and agitated therein and is subsequently expelled from the outlet 13 of the pump through a conduit 14 which enters a vortical vessel 16 through a tangential inlet 17. If desired, untreated make-up water may be added through a connection 15 and initially undergo the treating process. The velocity of flow of the liquid passing through the conduit 14 is such as to impart a circumferential whirl or vortical movement to fluid entering the vessel 16. The heavier particles of the liquid contents are centrifugally moved toward the out-side of the vessel, from whence they descend and tend to collect in the sump 18 thereof, whereas lighter or foamy particles ascend and gather in the upper dome 19 of the vessel. The general body 21 of liquid within the vessel circulates relatively slowly during a protracted separation time, so that there is adequate opportunity not only for the solid matter gravitally to precipitate from the body of liquid but also for the light material gravitally to ascend and gather in the upper portion 22 thereof. Because of the protracted settling time, the vessel 16 and its connections may, if desired, be insulated against the gain or loss of heat.

In order that the precipitated and settled solid material can from time to time be removed from the vessel 16, I provide a drain outlet 23 controlled by a manual valve 24 leading to a discharge 26, so that periodically upon opening the valve 24 the solid material can be released from the vessel 16. In addition, I provide an outlet 27 leading through a manually controlled valve 28 to a discharge 29, so that supernatant material, in the form of foam or other light particles, can be released from the upper portion of the vessel 16.

In order to separate the clarified liquid and release it from the vessel 16, I provide a bell 31 which is located substantially coaxial with the generally cylindrical vessel 16 and in the upper portion thereof, so that relatively quiescent liquid at the axis of the vessel is received within the bell 31. The upper part of the bell is connected by a pipe 32 to the container 6 and forms a return thereto, so that the superior pressure within the bell 31, imposed by operation of the pump 8 or other suitable means, is effective to restore substantially clarified liquid through the pipe 32 to the vessel 6.

The capacity of the pump 8 and the connecting pipes and of the vessel 16 is preferably insufficient to circulate all of the liquid within the container 6 through the settling chamber at any one time, it being adequate to circulate only a small portion thereof, so that the heat and pressure change is inconsequential but so that over a period of time there is ultimately circulated all of the liquid within the vessel.

Under certain circumstances the treating material in the chamber 9 can be dispensed with, and the tangential circulation and axial discharge from the vessel 16 are alone sufficient, after a plurality of circulations, to produce an adequately clear liquid. With this arrangement, even when solids are blown from the system, there is a very small amount of heat exchanging liquid discharged from the system, and the reduction in pressure due to discharge of solids and floating material through the outlets 26 and 29 is inconsequential in contrast to the large discharge ordinarily found in a boiler blow-off, for example.

While the structure in Fig. 1 is particularly illustrative of applications not only to a boiler but also to a cooling tower, I have shown in Fig. 2 an arrangement especially applicable to a boiler and one which is simplified in its mechanical components. In this arrangement there is incorporated a boiler 41 having a depending portion 42 to which circulating tubes 43 are joined. Due to the heating of the boiler and the arrangement of the tubes 43, liquid circulates in the direction of the arrows 44 and 46 with a considerable velocity, so that by providing a connection 47 controlled by a valve 48 to the usual boiler blow-down outlet 49, I can withdraw a part of the circulating liquid and conduct it through a pipe 51 into one end of a settling chamber 52.

This end is separated from the remainder of the chamber by a baffle 53 depending from the upper portion thereof. Liquid which is so introduced into the chamber 52 must flow downwardly behind the baffle 53, adjacent the bottom of the chamber, and then can rise therein and flow axially therealong but at a greatly reduced rate since the diameter of the chamber is much greater than that of the conduit 51. As the liquid proceeds through the chamber 52, the solid portions thereof settle onto the bottom, whereas any floating material accumulates on the surface of the liquid within the drum. Periodically the accumulated materials can be blown off through a lower outlet 54 under the control of a valve 56, or through an upper outlet 57 under the control of a valve 58.

After the liquid has passed substantially through the container 52 it flows beneath a baffle 59 depending from the upper portion of the settling chamber and effective to segregate the floating material, and the clarified liquid therefore is collected at one end of the chamber 52 and returns through a conduit 61 having a valve 62 therein for regulating the rate of flow, into a fitting 63 disposed in the depending portion 42 and shaped so that the fluid flowing by the fitting in the direction of the arrow 44 will assist in inducing the return flow.

In the event it is not feasible to provide two separate connections to the boiler, it is possible to effect an arrangement as shown in Fig. 3. To the boiler wall 71 is fastened a collar 72 into which is threaded a thimble 73 having an inclined internal terminus 74 thereon. A pipe connection 76 is formed at one side of the thimble, so that liquid flowing in the direction of the arrow 77 encounters the projection 74 and is diverted into the pipe 76. A return pipe 78 is axially engaged with the thimble 73 and projects therethrough beyond the terminus 74 to end in a beveled terminus 79 of opposite inclination. Liquid flowing in the direction of the arrow 77 induces flow in the direction of the arrow 81, thereby completing the liquid circuit.

I claim:

A liquid treatment apparatus comprising a chamber containing turbulent liquid, a container adapted to contain quiescent liquid, a conduit joining said chamber and said container tangentially adjacent the top of said container, an imperforate walled cylindrical baffle depending from the top of said container between said conduit and the center thereof, a pipe extending from the top of said cylindrical baffle to said chamber, and means at the top and bottom of said container for discharging the contents thereof.

LUCIUS F. PAYNE.